INVENTOR
ARTHUR DEUTCH
BY Pattison, Wright & Pattison
ATTORNEYS

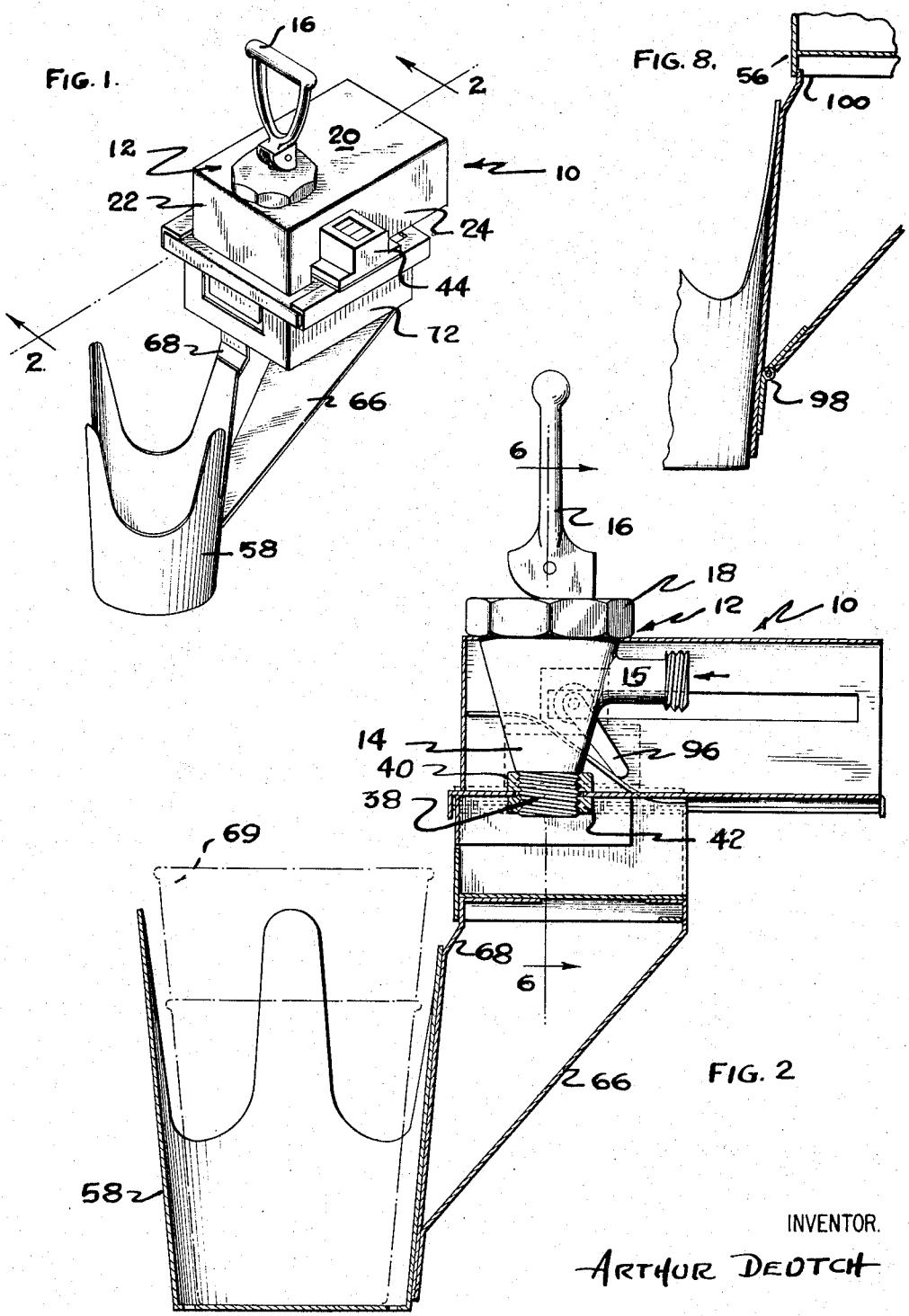

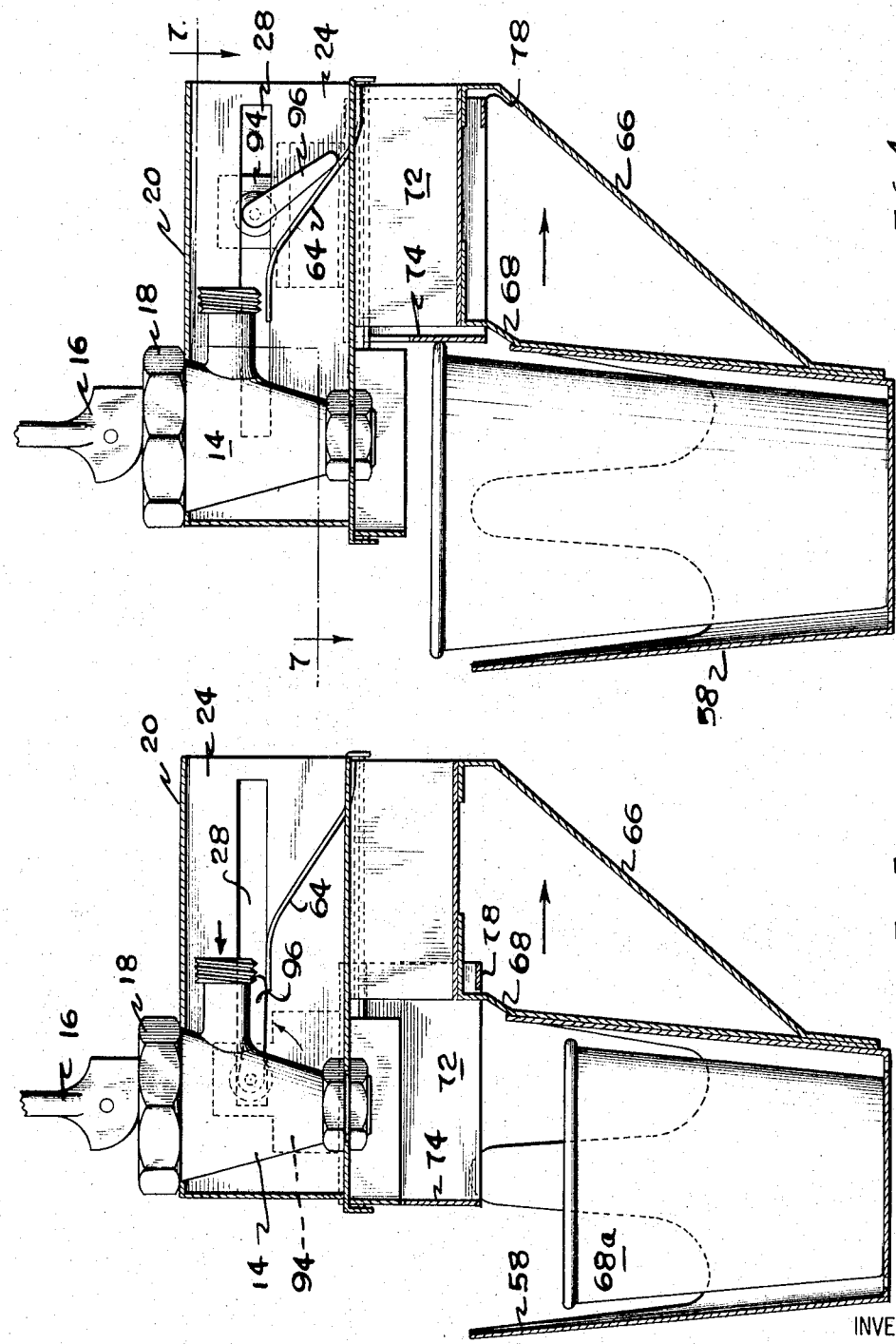

Feb. 27, 1968   A. DEUTCH   3,370,750

DISPENSING SPIGOT WITH COUNTER

Filed Dec. 1, 1965   4 Sheets-Sheet 4

INVENTOR
ARTHUR DEUTCH

BY Pattison, Wright & Pattison
ATTORNEYS 3,370,750
DISPENSING SPIGOT WITH COUNTER
Arthur Deutch, 8400 NW. 10th Ave.,
Miami, Fla. 33150
Filed Dec. 1, 1965, Ser. No. 510,902
5 Claims. (Cl. 222—30)

ABSTRACT OF THE DISCLOSURE

Apparatus for recording each dispensing operation of a beverage dispenser to ensure accounting for all beverage sales from the dispenser which includes components to selectively and separately record the filling of different sized containers from the dispenser, said apparatus further including a manually operated spigot having a receptacle holder movable into and out of position relative to said spigot and operably engaged with a mechanical counter.

---

The present invention relates to dispensers and more particularly and specifically to new and useful improvements in a dispensing spigot having a recorder for registering each dispensing operation.

Heretofore it has been a continuing problem of owners of soda fountains, taverns and the like, to safeguard their proceeds from dishonest employees who put a portion of the cash receipts in their pocket rather than in the owner's cash register. In beer taverns and like ventures the owner could protect himself against dishonest employees if he could compare cash receipts against the number of glasses of draft beer or the like dispensed.

The principal object of the present invention lies in the provision of a unique attachment for a dispensing spigot, such as a beer tap or the like which counts and records the number of glasses filled with the tap.

Another object of the present invention resides in the provision of a unique attachment for a dispensing spigot, such as a beer tap or the like, which counts and separately records the number of glasses filled from the tap.

Still another object of the present invention resides in the provision of a structural unit which is capable of quick and ready attachment to any conventional bar or fountain dispensing spigot and which will function to record each glass of liquid dispensed therefrom.

A further object of the present invention lies in the provision of a new and useful attachment for a dispensing spigot which incorporates plural counting recorders each acting cooperatively with components of the attachment to count and separately record filled glasses of different capacities, such as 6 and 10 ounce glasses.

Still another object of the present invention rests in the provision of a novel and useful attachment for a dispensing spigot which functions to prevent dispensing without actuation of the recorder components, and which permanently records each dispensing operation.

Still a further object of this invention resides in the provision of a spigot attachment of the type described which is of simple and inexpensive design and manufacture and one which is sturdy and durable over extended periods of use.

Still additional objects and advantages of the present invention will become more readily apparent to one skilled in the art when the following description is read in the light of the accompanying drawings.

The nature of the present invention may be stated in general terms as relating to an attachment for a dispensing spigot, such as a beer tap or the like, which includes a housing unit secured to and enclosing a portion of the spigot, plural recording members carried by said housing, sliding components for actuating said recorders, means for supporting a glass or liquid receptacle to receive discharge from said spigot, said receptacle supporting means being cooperatively supported from and movable relative to said recorder actuating means, and means engageable by a glass or receptacle of a pre-selected size supported in said receptacle holder for independent actuation of one or the other of said recorder means.

Referring now to the accompanying drawings in which like numerals designate similar parts throughout the several views:

FIG. 1 is a pictorial perspective view of the attachment constituting the present invention shown in application to a fountain spigot;

FIG. 2 is a vertical section taken on line 2—2, FIG. 1, with the attachment in inoperative position;

FIG. 3 is a view similar to FIG. 2 with the attachment components moved to an operative dispensing position for a small sized receptacle;

FIG. 4 is a view similar to FIG. 3 with the components in like positions for dispensing into a large sized receptacle;

FIG. 8 is a fragmentary vertical section showing a modified form of the receptacle container shown in FIG. 2;

Structure

Figure 5:
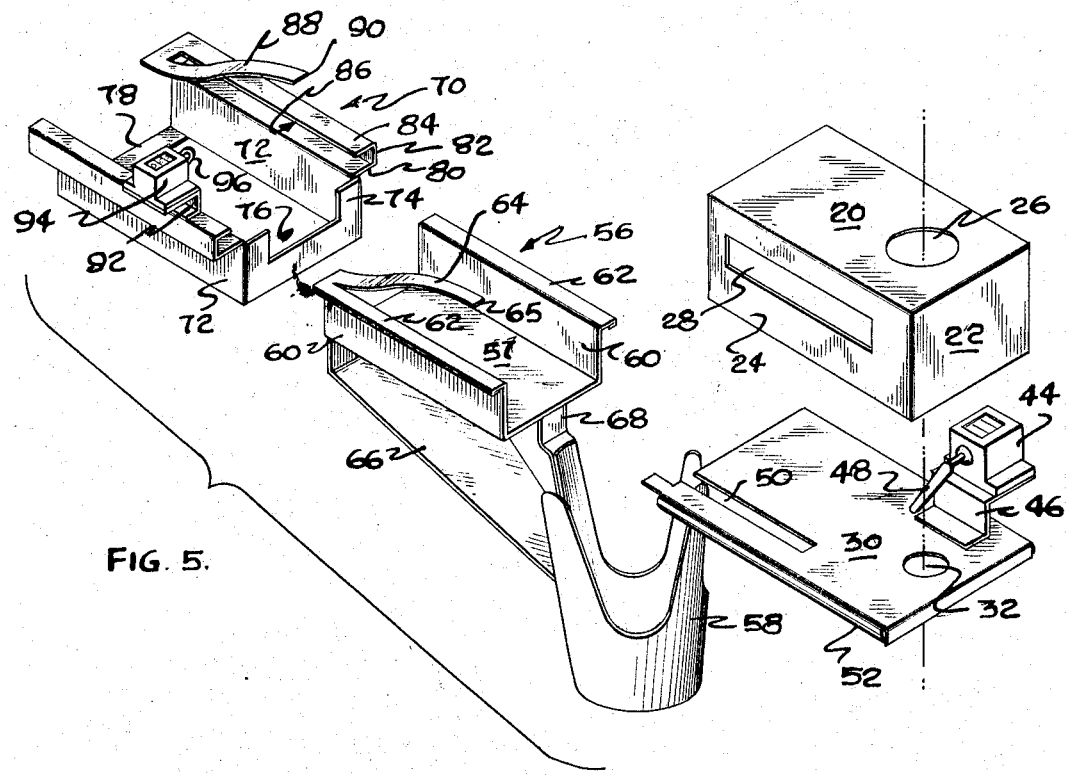
FIG. 5 is an exploded perspective view of the components constituting the attachment unit.
Figure 7:
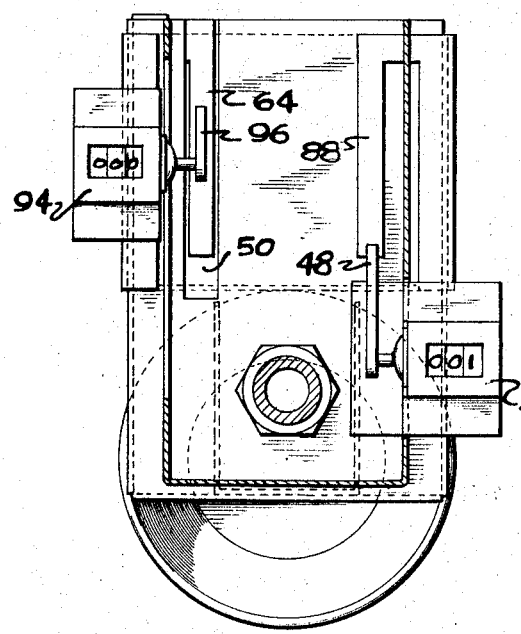
FIG. 7 is a horizontal section taken on off-set line 7—7, FIG. 4.
Figure 6:
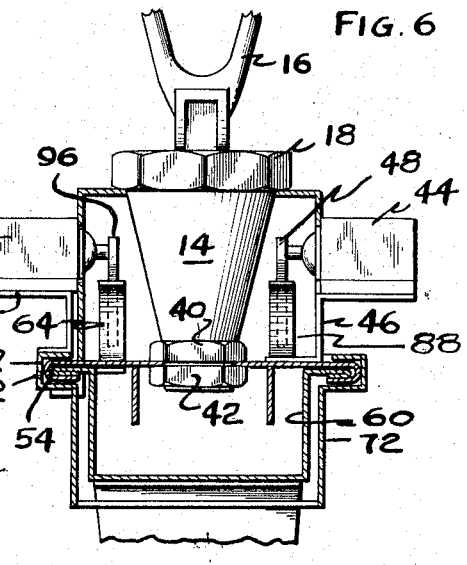
FIG. 6 is a vertical section taken on line 6—6, FIG. 2.

The dispensing unit constituting the principal embodiment of the present invention consists of a housing unit 10 secured to a typical fountain dispensing spigot 12 formed by a vertical, valved nozzle 14 having a liquid inlet 15 and a pivotal control handle 16 above the head portion 18 of the nozzle to control dispensing from the nozzle.

The housing 10 consists of a top wall 20, front wall 22, and side walls 24, the top wall having an opening 26 adjacent the front end thereof to receive in dependency therethrough the nozzle 14 adjacent the spigot head, and a longitudinal slot 28 in each side wall 24 (FIG. 5) for purposes to be hereinafter described. The housing is additionally provided with a bottom wall plate 30 of greater transverse and lesser front to rear dimension than said housing top wall 20. The plate 30 is provided with an opening 32 aligned vertically beneath opening 26 in the top wall 20 to receive therethrough the lower end of nozzle 14. The lower end of nozzle 14 is threaded, as at 38, for a distance above and below the bottom wall 30, and lock nuts 40 and 42, above and below bottom wall 30 respectively, are threaded on the nozzle and clamp the bottom wall between them to rigidly secure the housing to the nozzle.

A mechanical counter 44 is rigidly supported on the bottom wall 30 externally of one side wall of housing 10. An L-shaped bracket 36 mounts the counter in an elevated position adjacent the forward or nozzle end of the plate and to one side thereof. The counter presents an operating lever 48 disposed toward the centerline of the housing through slot 28 in the housing side wall for front to rear pivotal actuation thereof. An elongated front to rear slot 50 opens into the rearward edge of bottom plate 30 adjacent that side edge opposite the location of counter 44, and the two side edges of plate 30 are rolled or turned through 90 degrees, as at 52, to provide on the underside of the plate two inwardly, horizontally disposed guide channels 54.

Associated with the bottom wall 30 of the housing is a carrier plate 56 supporting a receptacle holder 58. The carrier plate 56 consists of a flat bottom wall 57 having upstanding side walls 60 each terminating in an outwardly projecting horizontal flange 62 folded inwardly beneath itself to double the thickness thereof. One side wall 60 of the carrier plate supports inwardly of the vertical plane thereof an elongated arcuate spring arm 64 which arches upwardly and forwardly from adjacent the rear end of the carrier plate to terminate intermediate the front to rear length of the carrier plate in a free end 65. The transverse dimensioning and positioning of the carrier plate and spring arm are such that the horizontal side wall flanges 62 will longitudinally engage in guide channels 54 of the bottom wall 30 of housing 10 disposing the spring arm 64 in longitudinal and vertical registry with slot 50 in plate 30.

The rearward end of carrier plate 56 is provided with a downwardly and forwardly projecting brace arm 66 which terminates in substantially the same vertical plane with the forward end of the carrier plate 56. The forward end of the carrier plate 56 supports a depending arm 68, the lower end of which is secured to the lower forwardmost end of brace arm 66. The depending arm 68 is secured through a portion of its vertical length to a cuplike receptacle holder 58 which has scalloped top edge portions to facilitate placement and removal of a drinking receptacle 69 therein.

To complete the dispenser structure of the embodiment shown in FIGS. 1-7, there is provided a counter frame 70 which is assembled in association with the housing 10. The counter frame 70 consists of two spaced upstanding side walls 72 joined between their forward extreme ends by an upstanding front wall 74 having a rectangular cutout portion 76 centrally of the top edge thereof. The rear extreme ends of the side walls are joined by a flat brace bar 78 extending transversely of the lower edges of the side walls.

The upper longitudinal edge of each side wall 74 of the counter frame is flanged perpendicularly outwardly, as at 80, where it is turned upwardly as at 82, and then inwardly, as at 84, to form a guide channel 86 opening inwardly of the frame. The top side wall edge portion 84 on the second longitudinal edge of the counter frame supports a channel bracket 92 thereabove on which is mounted a second mechanical counter 94. Counter 94 presents a pivoted operating lever 96 above a marginal side portion of frame 70 positioned for front to rear actuation thereof.

The dimensioning of the related elements of counter frame 70 are such that it may be horizontally, slidably engaged with channels 86 engaging about the side edges 52 of the bottom wall 30 of the housing and about the flanges 62 of carrier frame 56 which are nested in guide channels 54 formed by the side edges 52 of the bottom wall 30. When so assembled each of the counters 44 and 94 will be supported externally of the side walls of the housing 10 with the operating levers thereof disposed through housing side wall slots 28 within the housing. The operating lever 48 of counter 44 is aligned longitudinally of the housing with spring arm 88 with which it engages, while the lever 96 of counter 94 is aligned with and engages spring arm 64. The free ends of each counter lever lie upon and follow the upper curved surface of the respective spring arms when relative movement occurs between the levers and spring arms.

*Operation*

In operational use of the dispenser embodiment hereinbefore described, counter 44 will funcation to record each large sized receptacle or container filled from the nozzle 14 while counter 94 will record each small sized receptacle or container filled from said nozzle. For example, when a small sized receptacle 69a (FIGS. 2 and 3) is placed in receptacle holder 58, the holder may be moved rearwardly to position the receptacle 69a beneath nozzle 14. To reach this position the holder 58 moves carrier plate 56, to which it is secured, slidably rearwardly in respect to the bottom wall 30 of the housing and relative to the bottomless counter frame 70 suspended from housing bottom 30. Movement of the carrier plate as shown in FIG. 3 exposes the nozzle above the small receptacle 69a to permit filling thereof from the nozzle. When the receptacle has been filled the holder is pulled forwardly to reposition the carrier plate below the nozzle as shown in FIG. 2.

In the operation so far described it will be seen (FIGS. 2 and 3) that as carrier 56 is moved rearwardly operating lever 96 of counter 94 will ride upwardly on arcuate spring arm 64 and then downwardly as the carrier plate is returned to its original position, thereby accomplishing a single registration on the counter and resetting the same for the next subsequent movement of the carrier frame and receptacle holder.

When a large receptacle 69 is placed in the receptacle holder 58, the top of the receptacle will extend above the horizontal plane of the lower edge of the front wall 74 of the counter frame 70, and rearward movement of the receptacle holder will cause the top of the receptacle to engage and displace counter frame 70 rearwardly beneath the nozzle simultaneously with displacement of the carrier frame 56 to which the holder is secured. The displacement of counter frame 70 moves counter 94 and its actuating arm 64 simultaneously so that no counting function is performed by them, however spring arm 88 is moved beneath the actuating arm 48 of counter 44 which is fixed to a movable plate 30, thereby causing a single occurrence registration on counter 44 when the large receptacle is brought into dispensing position beneath nozzle 14 (FIG. 4). Counter 44 is reset for subsequent registration when receptacle holder 58 and receptacle 69 are pulled forwardly from beneath nozzle 14.

In FIG. 8 of the drawings there is shown a modified form of the receptacle holder 58 which permits the holder and any receptacle therein to be tilted relative to the vertical axis of the nozzle 14 permitting beer or other carbonated beverage to be dispensed against the side of a receptacle in the holder to curtail excessive foaming thereof. In this form brace arm 66 is hinged, as at 98, to the lower extremity of the receptacle holder and vertical support arm 68 is not fixed to carrier frame 56, but extends vertically behind a lower front wall portion thereof to abut the same, as at 100, to prevent forward displacement of the receptacle holder while permitting rearward tilting displacement thereof about pivot hinge 98.

Figure 9:
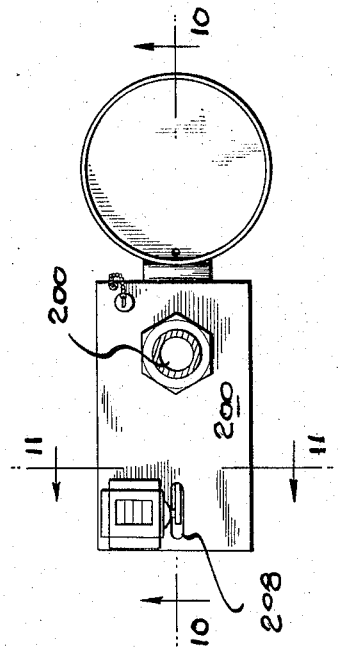
FIG. 9 is a plan view of a modified form of the attachment constituting the present invention.
Figure 11:
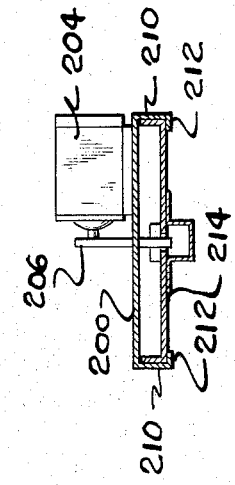
FIG. 11 is a vertical section taken on line 11—11, FIG. 9.
Figure 10:
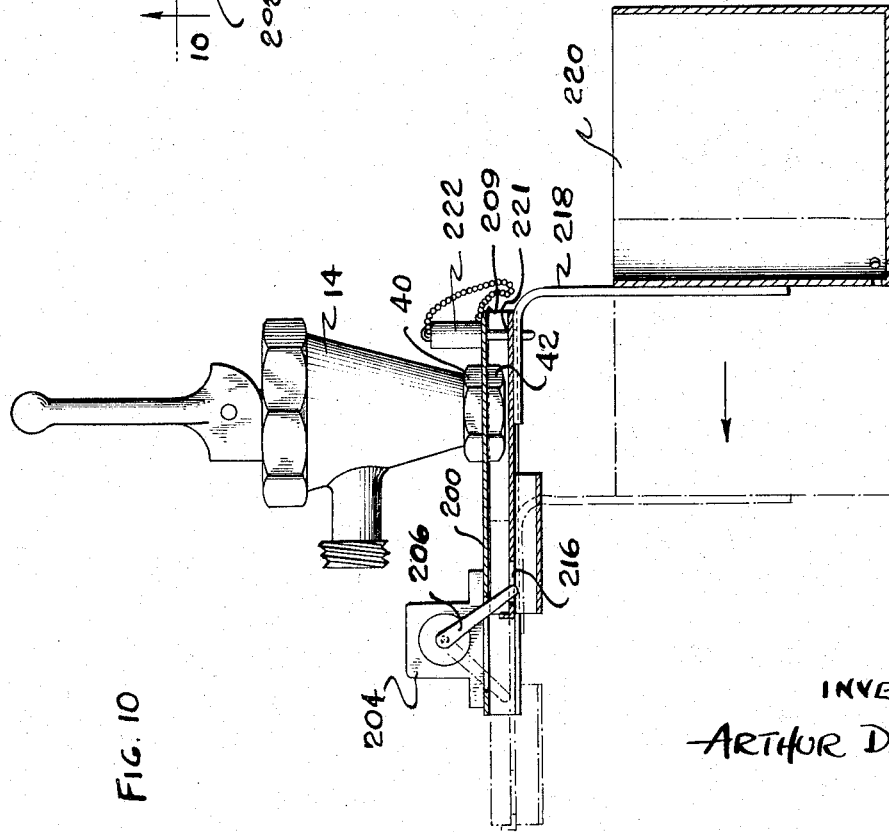
FIG. 10 is a vertical section taken on line 10—10, FIG. 9.

In FIGS. 9 to 11 of the drawings there is shown a modified embodiment of the invention wherein a single counter is fixed in association with a dispensing nozzle 14 of the type hereinbefore described to register the movement of a receptacle holder into and out of dispensing condition beneath the nozzle. In this form of the invention a flat mounting plate 200 is provided with an opening 202 on the longitudinal centerline thereof adjacent one end (forward) to receive therethrough the threaded end of the nozzle 14. The plate 200 is clamped or fixed to the nozzle by lock nuts 40 and 42 secured on the nozzle above and below the mounting plate 200. A mechanical counter 204 is secured on the upper surface of the mounting plate adjacent one rear corner thereof to present an operating lever 206 depending therefrom on substantially the longitudinal centerline of plate 200 which lever projects through a longitudinal slot 208 in the plate 200 to depend below said plate for a fixed distance. The forward end of plate 200 adjacent one corner thereof is provided with a vertical opening 209 for purposes to be hereinafter described.

The longitudinal side edges of plate 200 are flanged perpendicularly downward, as at 210, and the lower extremity of each flange is horizontally flanged inwardly beneath the plate for a spaced distance, as at 212. Associated with the plate 200 is a second plate 214 the transverse dimension of which permits it to be horizontally, slidably supported upon and between the remote, opposed inturned flange portions 212 of the side walls of plate 200. Plate 214, adjacent the rearward end thereof, is provided with a slotted opening 216 to receive the depending end of counter arm 206 therein, and the forward end of the plate is provided with a generally inverted L-shaped bracket 218 the long leg of which depends perpendicularly below the plate and supports forwardly of the plate therefrom a receptacle holder 220. Plate 214 is additionally provided with a vertical opening 221 located to register with the opening adjacent the forward edge of the upper plate 200.

As seen in FIG. 10 of the drawings, the two plates 200 and 214, are normally positioned with their front edges in vertical coincidence so that a lock pin 222 will vertically engage the two openings (209, 221) in the respective plates in registry adjacent the forward ends. When so located the receptacle holder 220 is outwardly offset relative to the vertical alignment of nozzle 14. When the lock pin 222 is removed the receptacle may be moved rearwardly in alignment beneath nozzle 14 thereby slidably displacing plate 214 rearwardly beneath plate 200 from which it is supported, at the same time moving actuating lever 206 of counter 204 to a rearward position as shown in dotted line in FIG. 10 to register a single actuation on said counter. When a receptacle has been filled from the nozzle the receptacle holder is again moved to the position shown in FIG. 10 resetting the counter for a subsequent operation and positioning the two plates to be interlocked by pin 222.

Having thus described and explained the construction and operation of the several embodiments of my invention, what I desire to claim is:

1. The combination in a liquid dispensing apparatus with a head, dispensing means in the head and an operating lever therefor, and a rigid discharge nozzle depending from said head; of an attachment for recording each dispensing operation of the apparatus including a housing unit secured about and enclosing the said discharge nozzle, vertically spaced plates horizontally slidably supported beneath said housing unit, a receptacle holder depending from one of said plates and normally positioned in vertical offset alignment beneath said discharge nozzle, two dial counters having actuator levers extending therefrom and being supported in spaced relationship adjacent said housing unit, and each of said sliding plates having abutment means operably engageable with the actuator lever of a different one of the two dial counters.

2. The combination defined in claim 1 wherein said housing unit includes: a horizontal platform fixed on said nozzle; a U-shaped plate horizontally slidably suspended beneath said platform and supporting in dependency therefrom a receptacle holder normally vertically offset from and beneath said plate; a substantially bottomless U-shaped bracket horizontally slidably suspended from said platform about and beneath said U-shaped plate, and a dial counter supported on said platform and having an actuator lever thereon, a second dial counter supported on said bracket and having an actuator lever thereon, a camming surface on said U-shaped bracket engageable with the actuator lever of said first-named counter upon sliding movement of said bracket, a camming surface on said U-shaped plate engageable with the actuator lever of said bracket supported counter upon sliding movement of said plate, said U-shaped plate being slidably independently of and with said U-shaped bracket.

3. A combination as defined in claim 2 wherein a receptacle abutment is formed transversely of that face of the bracket disposed toward the receptacle holder.

4. A combination as defined in claim 2 wherein said receptacle holder is fixed beneath said U-shaped plate on a restricted horizontal hinge permitting limited vertical tilting thereof beneath said nozzle.

5. The combination in a liquid dispensing apparatus with a head, dispensing means in the head and an operating lever therefor, and a rigid discharge nozzle depending from said head; of a housing secured on said head about said dispensing nozzle, counting means having an operating lever thereon supported by said housing, a receptacle holder horizontally slidably supported in dependency from said housing beneath and normally vertically offset from said dispensing nozzle, means associated with said receptacle support engageable with said counter operating lever upon sliding movement of said receptacle holder to an aligned position beneath said dispensing nozzle, a second counting means supported adjacent said housing and provided with an extended actuator lever thereon, a bracket horizontally slidably suspended from said housing independently of said receptable holder, said bracket presenting an abutment plate above said holder and offset therefrom in the direction of sliding movement thereof, and said bracket having means aligned in the direction of sliding movement thereof with the operating lever of said second counting means.

References Cited
UNITED STATES PATENTS

| | | | |
|---|---|---|---|
| 289,155 | 11/1883 | Smith | 141—362 X |
| 391,288 | 10/1888 | Werrek et al. | 235—94 |
| 1,062,035 | 5/1913 | Ritchey | 235—94 |
| 1,219,939 | 3/1917 | Hammond et al. | 235—94 |

ROBERT B. REEVES, *Primary Examiner.*

HADD S. LANE, *Examiner.*